March 5, 1935. W. A. VAN BERKEL 1,993,466
SLICING MACHINE WITH MULTIPLE KNIVES
Filed Oct. 16, 1930  6 Sheets-Sheet 1

Inventor.
Wilhelmus A. Van Berkel,
By Chas. M. Nissen,
Atty.

Patented Mar. 5, 1935

1,993,466

UNITED STATES PATENT OFFICE 1,993,466

SLICING MACHINE WITH MULTIPLE KNIVES

Wilhelmus Adrianus van Berkel, Clarens, Montreux, Switzerland, assignor to U. S. Slicing Machine Company, La Porte, Ind., a corporation of Indiana Application October 16, 1930, Serial No. 489,071
In Great Britain November 8, 1929

10 Claims. (Cl. 146—98)

The present invention relates to slicing machines and has for one of its objects the provision of means for slicing a substance by means of a plurality of knives, these knives being arranged preferably to successively engage the substance being sliced. By this means, an entire substance such as a loaf of bread may be cut in one operation, that is, in one movement of the substance towards the knives.

Another object of this invention is to assemble a plurality of knives as a unit on a single holder so that the knives as a unit may be assembled on or disassembled from the machine as the case may be. The knives are spaced from each other a distance equal to the slice thickness required.

Another object of this invention is to provide a substance holder which has spaced members thereon which carry the substance against the knife and through the spaces provided between adjacent knives, said members being adapted to pass through the said spaces in order to accomplish the results specified.

More specifically, the members for carrying the substance against the knives and the slices from between the knives may be either rotatable continuously, rockable back and forth, or movable continuously by means of an endless conveyor. In adition the members may carry mechanisms for· holding the substance and the slices releasably.

In the preferred embodiment of my invention the knives are circular knives mounted on a sleeve or mandrel. The knives are preferably of different diameters, the largest being preferably arranged at the center and the other knives extending outwardly therefrom being of successively smaller diameters. In this manner the substance will engage the knives successively and the load on the driving mechanism will be lessened.

Another object of this invention is to provide means for carrying the slices away from the knives after the slices have been formed. This means may be an endless conveyor or any other suitable means.

Another object of this invention is to provide mechanism for automatically feeding a plurality of substances successively to workholders which in turn carry the substances towards the knives.

Other objects of this invention will appear hereinafter as the description thereof proceeds, the novel features and combinations being pointed out in the appended claims.

Figure 1:
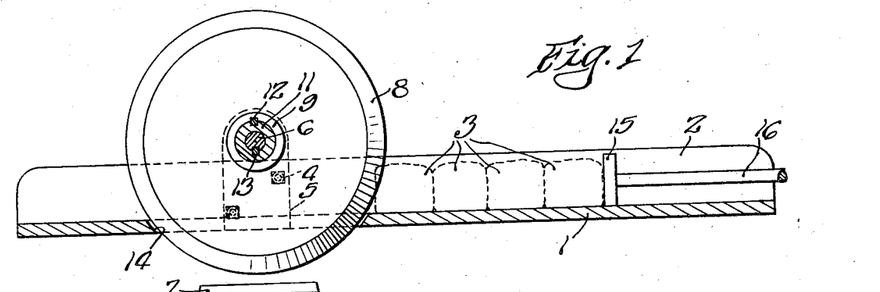
Fig. 1 represents a vertical section of a device embodying my invention.
Figure 2:
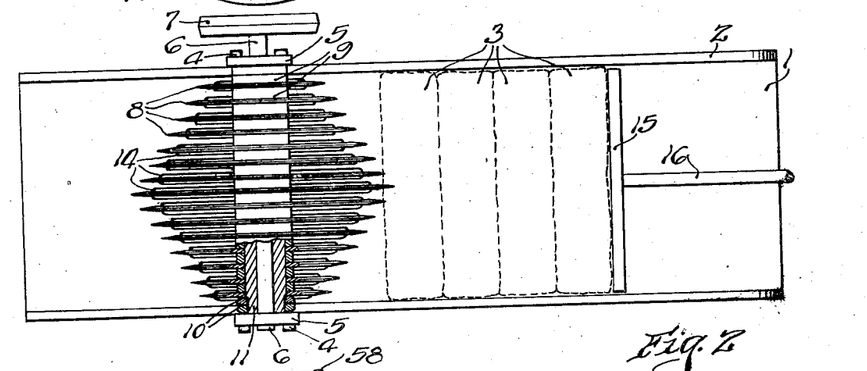
Fig. 2 is a plan view of the device shown in Fig. 1.

In Figs. 1 and 2 I have illustrated a very simple form of my invention. A substance support 1 having upstanding guide members 2 on opposite sides thereof is adapted to support the substance being sliced. In the present instance the substance is indicated by the reference numeral 3. Secured to the guide members 2 by means of the bolts 4 are a pair of brackets 5 which rotatably receive the shaft 6 to which is secured a pulley 7 adapted to be driven by a belt from any suitable source of power.

A plurality of circular knives 8 are spaced from each other by means of the spacing collars 9 mounted on the sleeve 11 and locked in place by means of the nuts 10. Each of the knives is keyed by means of the key 12 to the sleeve 11 so as to rotate therewith and the shaft 6 is keyed to the sleeve by means of the key 13.

With this arrangement the knives may be assembled as a unit on the sleeve and this unit may be put into position and the shaft 6 passed through the brackets 5 and the sleeve 10 to bring the shaft and sleeve in proper operative relation with each other.

It will be noted from an inspection of Figs. 1 and 2 that the knives are of varying diameters, the largest being at the center and the others decreasing in diameter from the center towards the opposite ends of the sleeve 10.

The support 1 is provided with suitable slots 14 adapted to receive the knives, the portions between the slots acting as supporting means for the slices when the slices are between the knives. Since the knives do not engage the loaves of bread at the same instant, but successively come into action, the load on the driving apparatus is lessened and is better distributed. Furthermore, the cutting action is benefited by this arrangement.

A pusher or feeding element 15 having an operating handle 16 is adapted to move the substances being sliced towards the knives, it being noted that preferably each substance being sliced is in engagement with the next successive substance to be sliced. This does away with the necessity of providing a feeding mechanism which would have to have special fingers or operating elements for entering the spaces between adjacent knives.

Figure 3:
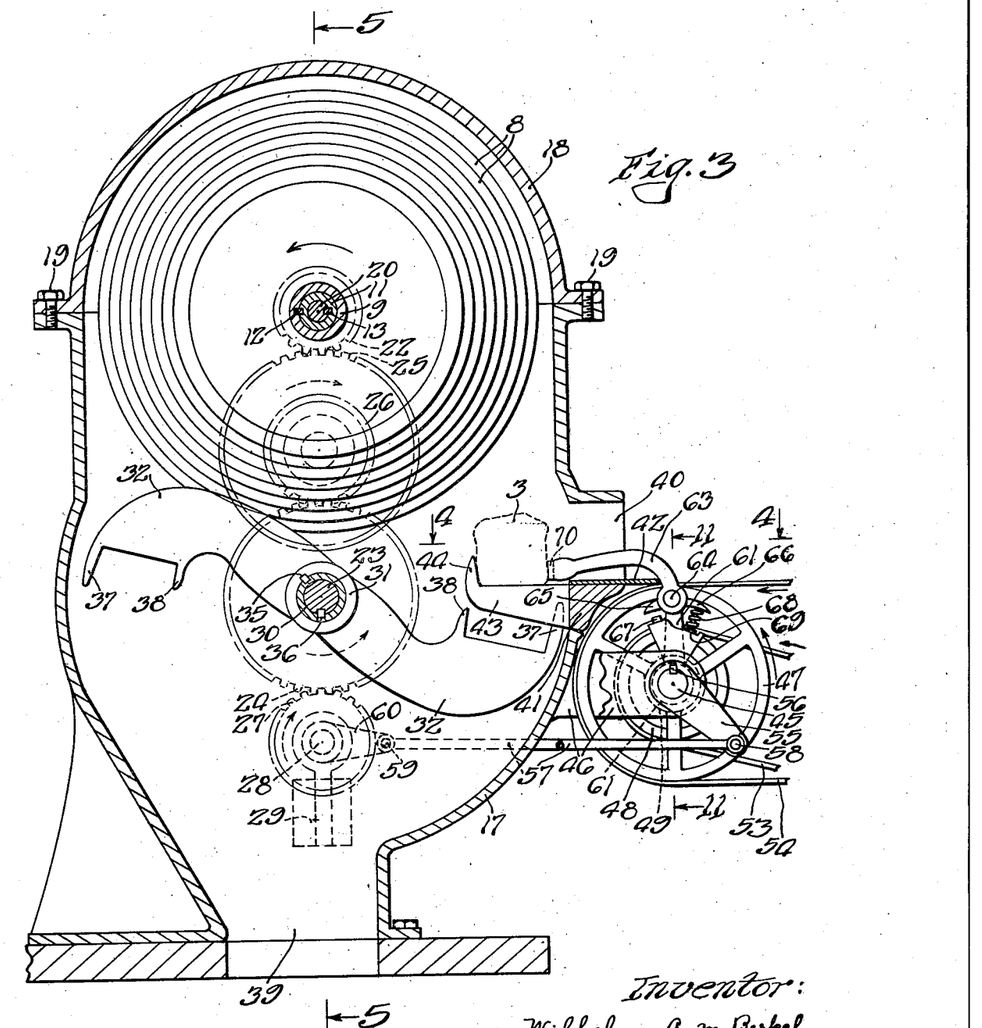
Fig. 3 is a vertical section through a modified form of my invention showing automatic work presenting mechanism, the section being taken transversely to the shaft which supports the knives.
Figure 4:
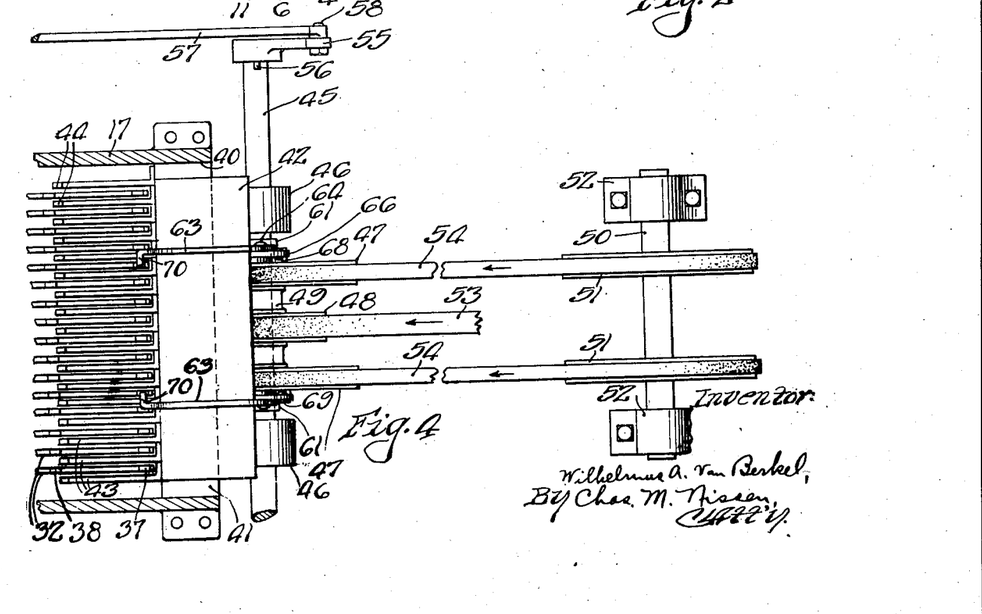
Fig. 4 is a section taken substantially along the line 4—4 of Fig. 3.
Figure 5:
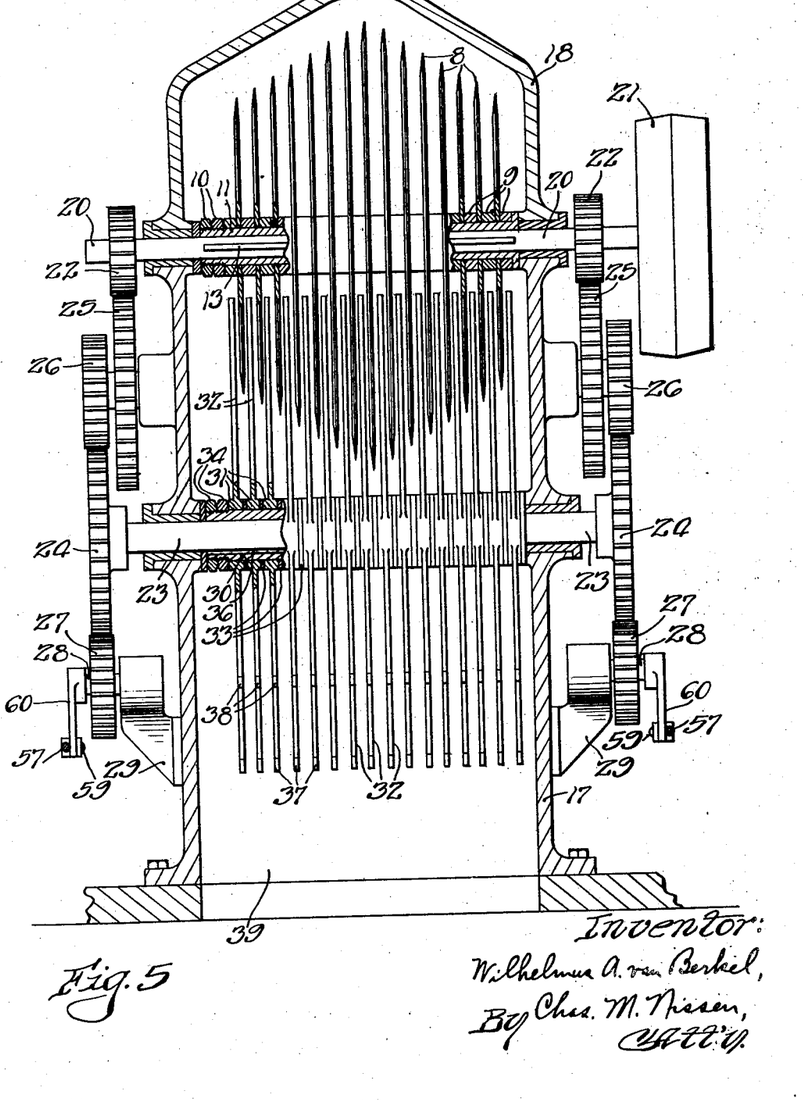
Fig. 5 is a section taken substantially along the line 5—5 of Fig. 3.

In Figs. 3, 4 and 5, I have illustrated a modified form of my invention which is more complicated than that shown in Figs. 1 and 2 but is more efficient and productive in view of the fact that the same is operated automatically and continuously. The bread is also fed by power means towards the knives which is of course more desirable than the hand feed shown in Fig. 1 as it enables the operator to devote his attention to other things.

In this modification the machine is provided with a hollow casing composed of the lower casing 17 and the upper casing 18 secured together by bolts 19. In this form of the invention the knives are mounted in the same manner as in Figs. 1 and 2 and the corresponding reference numerals in Figs. 3, 4 and 5 refer to corresponding parts in Figs. 1 and 2. In this instance however, the shaft 20 upon which the sleeve 11 is mounted carries in addition to the driving pulley 21, gears 22 arranged on opposite sides of the casing. A second shaft 23 parallel to the shaft 20 is rotatably mounted in suitable bearings in the opposite sides of the casing, and carries the gears 24 rigidly secured thereto. The gears 24 are driven from the gears 22 by means of the gears 25 and 26. It is understood, of course, that the two gears 25 and 26 are secured together so that they will rotate in unison. The gears 24 also mesh with the gears 27 secured to shafts 28 which are journaled in the brackets 29 secured to the lower casing 17.

A sleeve 30 carries a plurality of members 31, each of which has the oppositely extending arms 32. These arms are secured to the sleeve 30 in a manner similar to that in which the knives are secured to the sleeve 11. That is, the members are spaced by means of the spacing collars 33 and frictionally clamped against each other by means of the nuts 34. Each of the members 31 is prevented from rotation relative to the sleeve 30 by means of the key 35, and the sleeve is prevented from rotation relative to the shaft 23 by means of the key 36 as will be clearly seen from an inspection of Fig. 3.

The ends of the arms 32 have upwardly extending projections 37 and 38 between which a loaf of bread is adapted to be positioned, that is, the recess formed between the projections 37 and 38 is adapted to act as a supporting means for the substance as it is moved towards the knives.

It will be noted from an inspection of Fig. 5 that the arms 32 are staggered with relation to the knives and will pass between adjacent knives to thereby carry the bread not only against the knives, but also carry the slices through the spaces between the knives to a position where the same may be properly disposed of.

In Fig. 3 it will be seen that due to the rotation of the gears, the shaft 23 will rotate in a counter-clockwise direction thereby carrying the bread between the knives from right to left, the slices passing downwardly into the casing and out through the opening 39 at the bottom thereof after they have been formed.

In the front part of the casing, which is that portion shown to the right in Fig. 3, there is an opening 40 through which the loaves of bread or other substances are fed into the casing. A bar 41 secured to the casing at the bottom of the opening 40 supports a plate 42, and also carries a plurality of supporting brackets 43 having upwardly extending fingers 44, to limit the inward movement of the loaves of bread. When the bread has been moved to the position shown in Fig. 3, one set of the arms 32 moves upwardly into engagement with the loaf and removes the loaf from the brackets 43, it being understood that the arms 32 and the brackets 33 are staggered so as to permit the arms to come up between adjacent brackets as best illustrated in Fig. 4.

In practice I prefer to feed the loaves automatically onto the brackets 43 and against the stops 44, and this is accomplished in the following manner:

A shaft 45 journaled to rotate in the brackets 46 secured to the casing, carries a pair of pulleys 47 adapted to rotate with a drive pulley 48 spaced therefrom by means of the sleeves 49 and secured rigidly thereto. A shaft 50 in spaced parallel relation to the shaft 45 has the pulleys 51 secured thereto, the shaft being rotatably supported by the brackets 52. The pulleys 47 and 48, while secured to each other are not secured to the shaft 45 but rotate freely thereon. A driving belt 53 passing over the pulley 48 and driven from any suitable source of power is adapted to drive the pulley 48 and consequently the pulleys 47, the direction of rotation of the pulleys and of the belts being indicated by arrows in Figs. 3 and 4.

Figures 6, 7, 11:
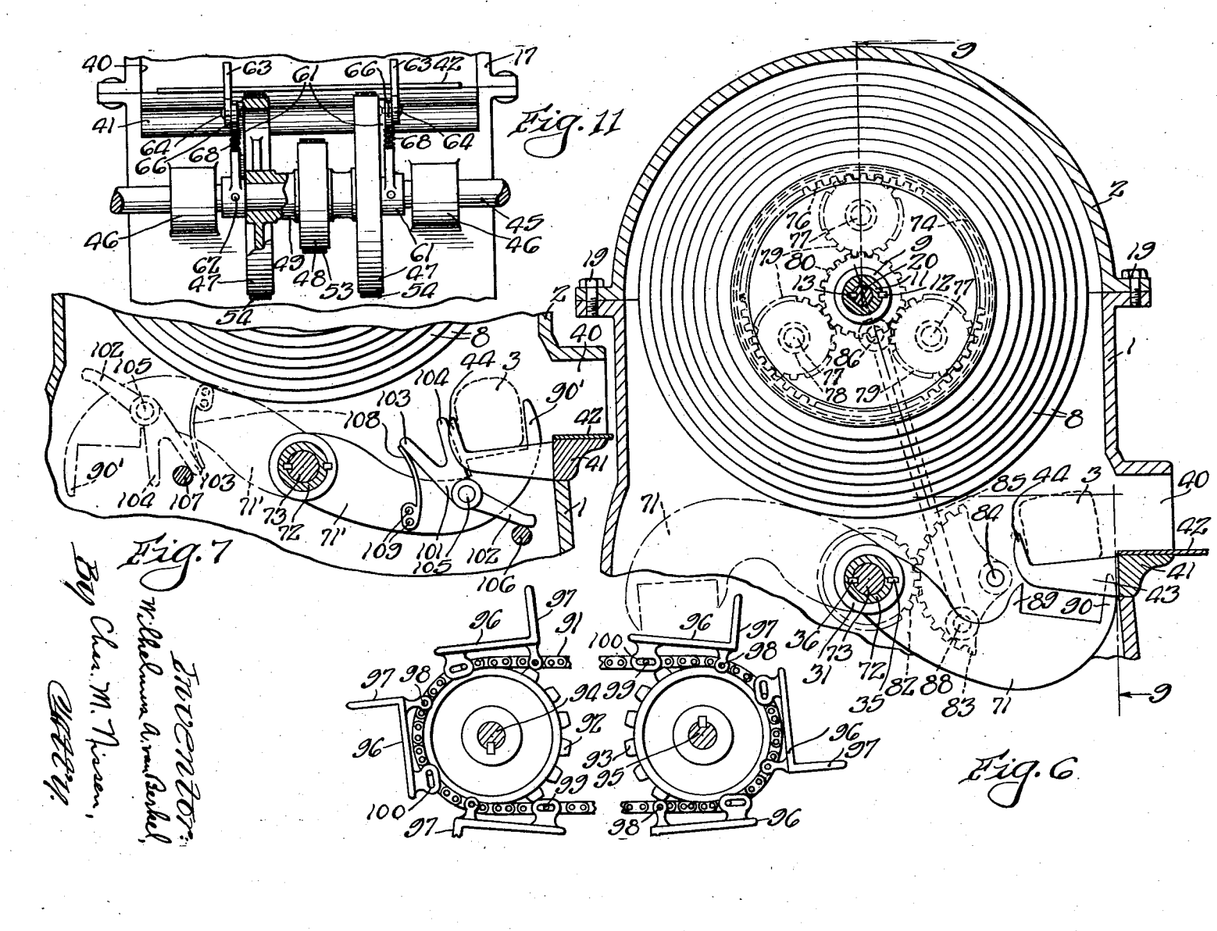
Fig. 6 shows a modified arrangement for the work presenting mechanism.
Fig. 7 illustrates a modification of the work presenting mechanism in which the same is provided with automatically releasable mechanism for releasably holding the substance to be sliced.
Fig. 11 is a section taken along the line 11—11 of Fig. 3.

Conveyor belts 54 are trained over the pulleys 47 and 51, and will move in the direction indicated by the arrows. The loaves of bread are placed on these conveyor belts 54 and conveyed onto the plate 42 and against the stops 44 in the following manner:

Referring now more particularly to Figs. 3, 4 and 11, it will be seen that the shaft 45 has arms 55 secured thereto by means of the keys 56. Links 57 pivoted at 58 to the arms 55 are also pivotally secured at 59 to arms 60, secured to the shafts 28. It will be noted that the arms 60 are shorter than the arms 55 and that therefore, although the arms 60 rotate continuously in one direction, only an oscillating movement will be imparted to the arms 55 and as a result, to the shaft 45. This rocking movement of the shaft 45 is utilized for the purpose of feeding the loaves of bread against the stops 44.

I secure a bracket 61 to the shaft 45 by means of the pins 62, see Fig. 11. Each of these brackets carries an arm 63 pivoted thereto at 64, this arm having abutments 65 and 66 rigid therewith. This is for the purpose of causing the abutments 65 and 66 to pivot with the arms 63 and for a purpose which will appear presently. The brackets 61 also have the fixed stops 67 and springs 68, the latter being interposed between the abutments 66 and the surfaces 69 of the members 61. The forward ends of the arms 63 have offset substance engaging portions 70. The operation of this mechanism is as follows:

In Fig. 3 the arms 63 are shown in their extreme advanced position with the bread arranged against the stops 44. As the arm 60 continues its rotative movement from the position shown in Fig. 3, the shaft 45 will be given a clockwise movement due to the connections 57 and 55 between the shaft 45 and the arm 60. This movement of the shaft 45 carries with it the arms 63 and the springs 68 urge the arms in a counter-clockwise direction so that the abutments 65 engage the stops 67 to limit the counter-clockwise movement of the arms. When the arms 63 have been fully retracted to a position approximately 90° from that shown in Fig. 3, the shaft 45 will begin to rotate in a counter-clockwise direction to move the arms 63 against the next loaf of bread. When the loaf of bread abuts against the stops 44, the springs 68 will yield to permit further movement of the shaft 45 and member 61 without advancing the loaf 3 towards the stops. Thus successive loaves are fed from the conveyor belts 54 onto the plate 42 and against the stops 44 of the brackets 43. The arms 32 thereafter rotate to engage the bread and carry the same into engagement with the knife as previously described. It will be noted that I have shown two arms 32, and with this arrangement two loaves of bread may be sliced for one rotation of the shaft 23. If practical more arms may be used.

The arrangement shown in Figs. 3, 4 and 5 has proven very satisfactory but there are other arrangements of my invention which have been found to be very desirable under certain conditions and for certain purposes. One of these is clearly shown in Figs. 6 and 9. In this arrangement again we have the knives supported in the same manner as in the previous modifications and the same reference numerals used in the previous modifications indicate similar parts in the modification shown in Figs. 6 and 9.

The mechanism for feeding the loaves into the opening 40 may be the same as in the modification shown in Figs. 3, 4 and 5, but I have not illustrated any feeding mechanism in this form of the invention as the modifications employed therein do not affect the feeding mechanism whatsoever.

A plurality of arms 71 each of which is formed similar to the arms 32 in Figs. 3, 4 and 5, are secured to a sleeve 72 which in turn is secured to a shaft 73 in the same manner that the arms 32 are secured to the sleeve and shaft shown in Figs. 3, 4 and 5. It will be noted however, that the arms 71 extend only to one side of the shaft 73 intsead of to both sides thereof as do the arms 32.

Figure 9:
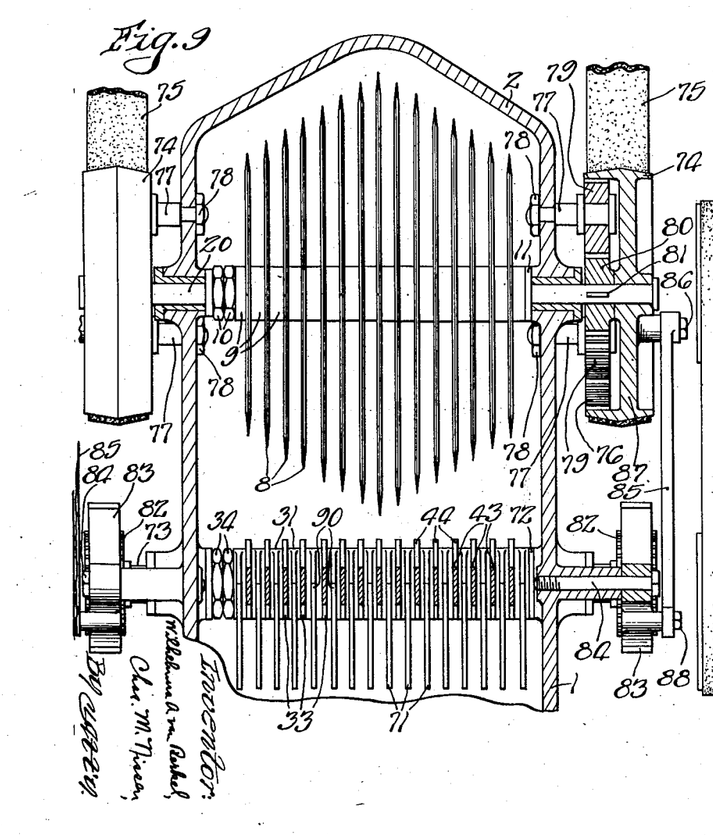
Fig. 9 is a section taken substantially along the line 9—9 of Fig. 6.

The shaft 20 has pulleys 74 rotatably mounted thereon, and these pulleys are driven by means of belts 75 from any suitable source of power. Each of the pulleys 74 is provided, as best illustrated in Fig. 9, with an internal gear 76 formed on the inner periphery of the flange of the pulley. Stub shafts 77 secured to the casing by means of the nuts 78 each carry a gear 79 rotatably mounted on the stub shafts and meshing with the teeth of the internal gears 76. Gears 80 keyed to the shaft 20 by means of the keys 81 mesh with each of the adjacent gears 79. The internal gears 76, gears 79, and gears 80 form a planetary system of gearing for rotating the shaft 20. In other words, as the pulleys 74 are driven, the gears 79 are rotated by means of the internal gears 76 and the gears 79 in turn rotate the gears 80 secured to the shaft 20 to thereby cause the knives to rotate at a greater rate of speed than the pulley 74.

The shaft 73 has gears 82 secured thereto at the opposite ends thereof, and these gears mesh with the segmental gears 83 rotatably mounted on the stub shafts 84 secured to the casing. Links 85, pivoted at 86 to the webs 87 of the pulleys 74 and at 88 to the segmental gears, are adapted to oscillate the segmental gears 83 as the pulleys 74 are rotated.

It will be noted that the pivot 86 is at a shorter distance from the center of the shaft 20 than the pivot 88 is from the center of the stub shaft 84, so that a complete revolution of the pulleys 74 will not impart a complete revoultion to the segmental gears 83. Since the gears 83 and 82 are in mesh with each other, the shaft 73 will be oscillated and as a result, the arms 71 will also be oscillated back and forth between the full line position and the dotted line position shown in Fig. 6.

The oscillating movement is such that the arms move in a counter-clockwise direction between the full line and dotted line positions shown in that figure.

The mode of operation of the device shown in Fig. 6 is as follows:

The loaves of bread as in the previous modification, are fed onto the brackets 43 and against the stops 44. The arms 71 which are provided with the projections 89 and 90 similar to projections 38 and 37 respectively shown in Fig. 3 are adapted to form a recess for the bread and carry the bread against the knives and through the spaces between adjacent knives as in the previous embodiment.

In this instance however, the bread is not permitted to fall through an opening in the bottom of the casing, but is dropped onto suitable platforms carried by an endless conveyor. This endless conveyor comprises a pair of chains 91 spaced parallel (only one of which is shown) trained over sprockets 92 and 93 secured to shafts 94 and 95 respectively. Platform members 96 having abutments 97 thereon are pivoted at 98 to the chains 91. The platform members 96 also have pin and slot connections 99—100 to compensate for the movement of the members about the sprockets. The slices of bread which are carried by the arms 71 are deposited on the platform 96 when the arms reach the dotted line position illustrated in Fig. 6, the arms thereafter returning to their original positions to pick up the next loaf of bread. If desired, suitable guide members may be provided at opposite ends of the platforms 96 so as to prevent the slices from falling off the end thereof, or if desired, the platforms may be provided with end abutments as well as a side abutment.

In Fig. 7, I have shown a modified arrangement for the arms 71 shown in Fig. 6. With the arrangement shown in Fig. 7 the bread is yieldingly held while being sliced, but is released when the same reaches a position over the conveyor such as the conveyor illustrated in Fig. 6 or when the arms reach a position where the substance may be dropped as in Fig. 3. In this arrangement, each of the arms 71' carries a member 101 pivoted at 105, and this member 101 has the outwardly extending fingers 102, 103 and 104. The finger 104 takes the place of the abutment 89 shown in Fig. 6. A pair of stops 106 and 107 are rigidly secured to the casing and extend entirely across the casing so as to engage the fingers 102 and 103 on the members 101 in a manner which will now be described in connection with one of the arm 71'. A spring 108 secured at 109 to the arm 71' is adapted to yieldingly urge the member 101 in a clockwise direction.

Let us assume that the parts are in the position shown in Fig. 7. In this position of the parts, the bread is against the abutment 44 and is just ready to be received by the arms 71'. The arm is rotated in a counter-clockwise direction, and as the arm moves from the position shown in Fig. 7 into engagement with the bread, the finger 102 is permitted to rotate in a clockwise direction about the pivot 105 thereby permitting the arm 104 to rotate in a clockwise direction and since the finger 104 is normally urged in that direction by the spring 108, the arm 104 will engage the side of the bread opposite the abutment 90' and force the bread against the abutment 90' as the arm 71' moves away from the stop 106. During the slicing operation therefore the bread is yieldingly held between the finger 104 and abutment 90'. When the arm 71' reaches the dotted line position, the stop 107 engages the finger 103 and moves the member 101 against the action of the spring to withdraw the finger 104 from its yielding engagement with the bread. Therefore, the bread is released and is permitted to drop down either through an opening in the bottom of the casing or to a suitable conveyor or support.

Figure 8:
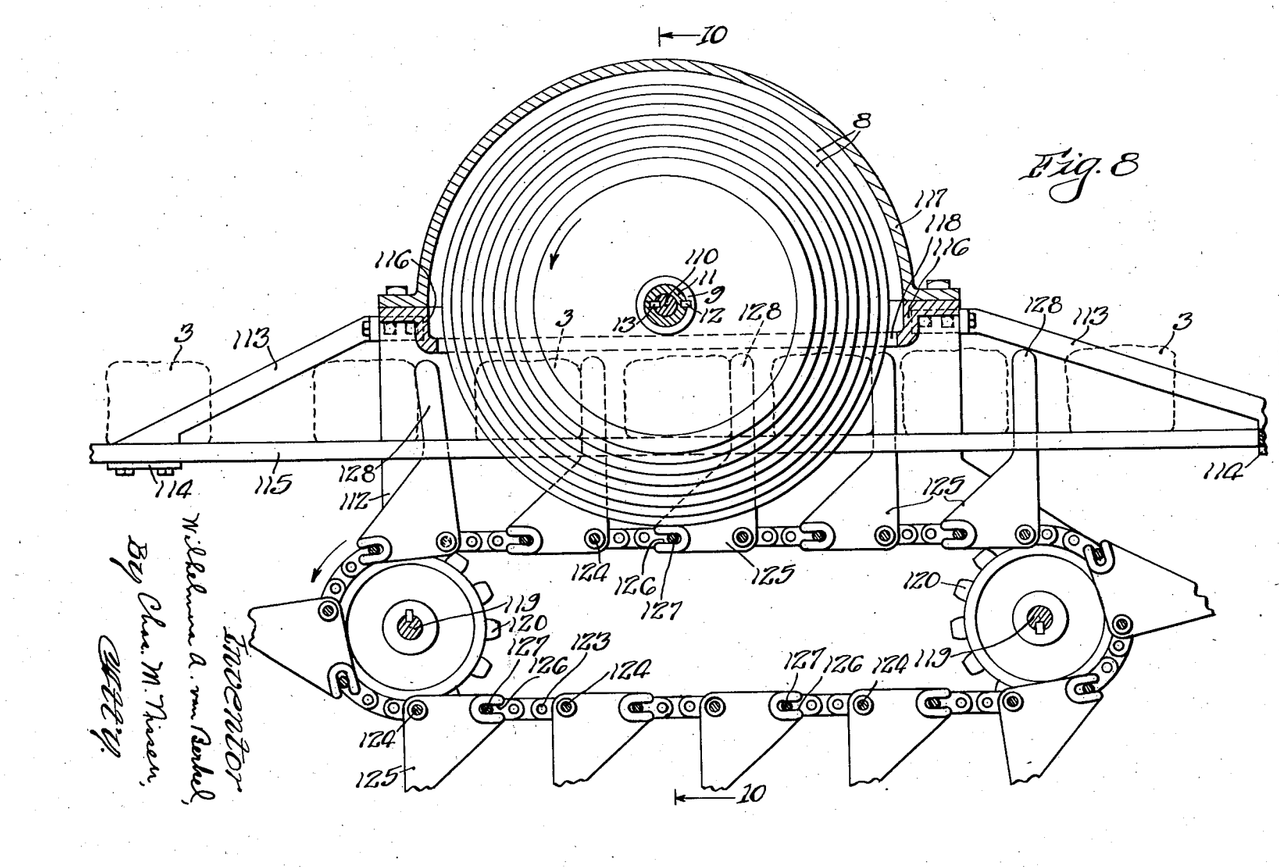
Fig. 8 illustrates a still further modification of my invention in which an endless conveyer is used for conveying the substances to be sliced into engagement with the knives.
Figure 10:
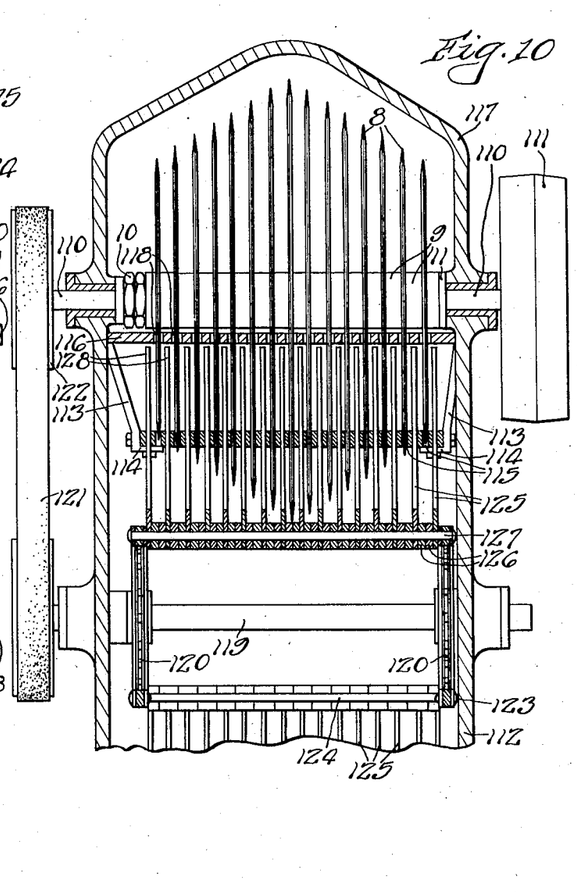
Fig. 10 is a section taken substantially along the line 10—10 of Fig. 8.

In Figs. 8 and 10, I have shown a still further modification of my invention. In this embodiment the knives are mounted the same as in the previous embodiments and the shaft 110 upon which the knife assembly unit is mounted is driven by means of a pulley 111. The casing 112 in this instance is open at the opposite ends thereof and brackets 113 having cross-members 114 supporting a plurality of parallel bars 115, two of which are arranged between each pair of adjacent knives, and which form the support for the substance as it is being sliced. A bracket 116 secured to the upper part 117 of the casing and above the bar 115, is provided with slots 118 for the reception of the knives. The portions of the member 116 between the slots are adapted to prevent upward movement of the substance as the substance is being cut. For instance if the knife were rotating in the direction of the arrow shown in Fig. 8, there would be a tendency for the bread to be carried upwardly due to the movement of the knife, but this is prevented by the member 116 as I have just pointed out.

In order to convey the substances along the supporting bars 115, I provide a pair of shafts 119 to which are secured the sprockets 120 arranged at opposite ends of the shafts as best illustrated in Fig. 10. One of the shafts 120 may be driven by means of a belt 121 from a pulley 122 secured to the shaft 110, or may be driven independently of the drive for the shaft 110. At any rate one of the shafts 119 is provided with means for driving the same. Chains 123 are trained over the sprockets on the shafts 119 and bars 124 are secured to opposed runs of the chains and preferably form pivots for some of the links.

Substance feeding members 125 pivoted to the bars 124 also are provided with slots 126, and rods 127 which also extend between opposite runs of the chains are adapted to be received in these slots for the purpose of taking care of the lost motion which occurs during the passage of the members 125 over the sprockets. The members 125 carry upwardly projecting fingers 128 which, as best illustrated in Fig. 10, are arranged between adjacent ones of the bars 115. The fingers engage the bread at one end of the support and move the same through the knives to the other end thereof where the slices may be disposed of in any desired manner. Thus the substance being sliced is fed continuously through the machine in one direction and the process of slicing the bread is of course continuous. If desired, the bread may be fed into the position indicated therefor, at the extreme right of Fig. 8 by means of pusher bars such as those shown in Figs. 3, 4 and 5, or by any other suitable means.

It will be noted from the arrangement of the knives that the knives may be assembled as a unit before being placed in the machine, and if it becomes necessary to repair the same they may be removed as a unit.

It will be understood, of course, that while I have shown knives of varying diameters, the same may all be made of the same diameter, or I may have the larger diameter knives at the ends and the smaller diameter knives near the middle or arrange the knives in any other manner which I may see fit.

It is not necessary that the knives be circular as I found that knives which are sickle-shaped may also be used. In this event the knives would preferably be arranged in staggered relationship to each other so as to act in sequence on the pieces of substance being sliced.

Obviously other changes may be made in the particular arrangements which I have shown and described by those skilled in the art to which this invention pertains without departing from the spirit of this invention, and therefore I do not wish to limit my invention except as set forth in the appended claims.

Having thus fully described my invention, what I desire to secure by Letters Patent of the United States is:—

1. In a slicing machine for slicing loaves of bread and the like, the combination with a rigid shaft mounted for rotation in suitable bearings, a plurality of knives mounted on said shaft, said knives being of different diameters and being arranged on said shaft in spaced parallel relation with each other and with the knife of largest diameter arranged substantially centrally of the others of said knives, with the others of said knives arranged on either side of the largest of said knives and in such a manner that the diameters of the knives vary inversely to the distance which each of said knives is from the largest of said knives, a support for bread to be sliced extending substantially parallel to said shaft and means for moving a substance to be sliced along said support toward said knives in a direction substantially perpendicular to said shaft.

2. In a slicing machine for slicing bread and the like, the combination with spaced parallel knives mounted for rotation about a fixed axis, pairs of spaced substantially continuous substance supporting strips between adjacent pairs of knives, movable fingers adapted to feed the substance to be sliced in a direction toward said knives, and being mounted on a conveyer element beneath said support and extending through the spaces between the pairs of substance supporting strips and above the surface of said substance supporting strips so as to engage the substance to be sliced and move the same into engagement with the knives as said conveyer element is moved, and means for moving said conveyer element, said knives being of different diameters and mounted to rotate substantially about the same axis so that the substance engages each of said knives at different points in its path of travel along said substance supporting strips.

3. In a slicing machine, the combination with a plurality of knives arranged in spaced parallel relation with each other, a carrier having a plurality of arms movable toward said knives and through the spaces therebetween, each of said arms having a substance gripping means normally yieldingly pressed into substance gripping position, a substance support upon which the substance is initially placed to be picked up by said carrier as it moves into substance receiving position, a stop arranged in the path of movement of a portion of each of said substance gripping means for moving each of said substance gripping means into inoperative position as the substance to be sliced is received by said carrier, said stop being operable to release each of said substance gripping means as said carrier moves from substance receiving position toward said knives, whereby the same are urged into yielding engagement with the substance.

4. A device as claimed in claim 3 in which a second stop is provided for moving each of said substance gripping means out of operative position after the carrier has moved to such a position that the slices formed by said knives are free of said knives.

5. A device as claimed in claim 3 in which the spaced parallel knives are of different diameters, and in which the knives are all mounted to rotate about substantially the same axis of rotation so that said knives engage the substance being sliced at different points along the path of movement of the substance.

6. In a bread slicer, the combination of a plurality of circular, concentrically arranged rotatable knives of various diameters, said knives being rotatable about a common axis, and means for moving loaves of bread to be sliced along a path such that said plurality of knives engage said bread successively at spaced intervals along the path of movement of said bread.

7. In a device for slicing loaves of bread or the like, the combination with a substance support, means for moving a substance along said support in a predetermined path, a plurality of knives arranged to rotate about a common axis and being of varying diameters so as to engage the substance being sliced at different positions of said substance along its path of movement, the time of presentation of the individual knives remaining the same for successive substances presented along the same path.

8. In a machine for slicing loaves of bread and the like, the combination with a substance support, a knife shaft arranged substantially parallel to said support, a plurality of knives carried by said shaft and rotatable therewith, all of said knives extending through the plane of said support and being of sufficient diameter to cut entirely through a loaf of bread presented thereto, said knives varying in diameter whereby as a loaf is moved along said support toward the axis of rotation of said knives, the said loaves are presented to said knives at different times during the period of travel of said loaf toward said axis.

9. In a slicing machine for slicing bread and the like, the combination with a movable slice receiving support, a plurality of knives rotatable about a common axis and arranged in spaced parallel relation with each other whereby to form a plurality of slices from a substance presented thereto, a carrier having a plurality of arms adapted to pass into the spaces between said knives and convey the substance to be sliced against and past said knives onto said movable slice receiving support, said knives being of different diameters varying substantially uniformly in diameter from the central knife outwardly toward the endmost ones of said knives.

10. In a slicing machine the combination with a plurality of rotating knives arranged in substantially parallel relation with each other, a planetary gearing for rotating said knives, an oscillating shaft, a plurality of arms carried by said shaft adapted to move toward and past said knives and through the spaces therebetween to convey a substance to be sliced into engagement with said knives, and to convey the slices out of engagement with said knives after the same are formed, an oscillating member actuated by said planetary gearing for oscillating said shaft, means for selectively positioning a series of substances in a position to be engaged by said arms as the same arrive at a substance receiving position, an endless conveyor having a plurality of slice receiving surfaces thereon for receiving slices after they are formed, and means for moving said endless conveyor in timed relation to the movement of said arms to bring selected ones of said slice receiving surfaces into slice receiving position as the sliced substance is carried past said knives.

WILHELMUS ADRIANUS VAN BERKEL.